US007110960B2

(12) United States Patent
Phillips et al.

(10) Patent No.: US 7,110,960 B2
(45) Date of Patent: Sep. 19, 2006

(54) EVENT REVENUE MANAGEMENT SYSTEM

(75) Inventors: Robert L. Phillips, Palo Alto, CA (US); Michael Eldredge, Menlo Park, CA (US); Dave Levett, Surrey (GB); Nancy Pyron, Smyrna, GA (US); Jeremy S. Cohen, Sunnyvale, CA (US); George Cao, Sunnyvale, CA (US); Kirsten Holmquist, Sunnyvale, CA (US); Bill Buckalew, Newnan, GA (US); Stanley Ye, Mountain View, CA (US); Andrew Mace, Peachtree City, GA (US)

(73) Assignee: Manugistics, Inc., Rockville, MD (US)

( * ) Notice: Subject to any disclaimer, the term of this patent is extended or adjusted under 35 U.S.C. 154(b) by 913 days.

(21) Appl. No.: 09/876,218

(22) Filed: Jun. 8, 2001

(65) Prior Publication Data

US 2002/0120492 A1    Aug. 29, 2002

Related U.S. Application Data

(60) Provisional application No. 60/210,354, filed on Jun. 9, 2000.

(51) Int. Cl.
*G06Q 99/00* (2006.01)
(52) U.S. Cl. .................... 705/10; 705/400
(58) Field of Classification Search ............ 705/10, 705/400
See application file for complete search history.

(56) References Cited

U.S. PATENT DOCUMENTS

| 5,404,291 A | * | 4/1995 | Kerr et al. ............... 705/5 |
| 5,797,127 A | | 8/1998 | Walker et al. ............ 705/5 |
| 5,918,209 A | | 6/1999 | Campbell et al. ........ 705/5 |
| 6,061,691 A | | 5/2000 | Fox ........................ 707/104 |
| 6,078,893 A | * | 6/2000 | Ouimet et al. ........... 705/10 |
| 6,182,048 B1 | | 1/2001 | Osborn et al. ........... 705/4 |

FOREIGN PATENT DOCUMENTS

WO    WO 97/25684 A1  *  7/1997

OTHER PUBLICATIONS

Belobaba, Peter P. "Application of A Probabilistic Decision Model To Airline Seat Inventory Control," Operations Research, vol. 37, No. 2, Mar.-Apr. 1989, pp. 183-197.*
Zaki, Hossam "Forecasting For Airline Revenue Managament" The Journal of Business Forecasting, Spring 2000, pp. 2-6.*
McGill, Jeffrey I. and Garrett J. Van Ryzin "Revenue Management: Research Overview and Prospects" Transportation Science vol. 33, No. 2, May 1999, pp. 233-256.*
Welki, A.M. and T.J. Zlatoper "US Professional Football: The Demand For Game-Day" Managerial and Decision Economics, vol. 15, (published 1994) pp. 489-495.*

(Continued)

Primary Examiner—Susanna M. Diaz
(74) Attorney, Agent, or Firm—Hogan & Hartson LLP

(57) ABSTRACT

The present invention provides an event revenue management system that calculates event pricing to manage revenue and to maximize profit from the event. In particular, the system uses event parameters, including timing, resource, and discount categories, and initializes forecasting parameters. The system aggregates historical data using the forecasting parameters to generate initial forecast statistics, taking into account the event parameters. It then forecasts demand by updating the initial forecast statistics based on current data and optimizes pricing and availability of the event based on the forecasted demand.

19 Claims, 7 Drawing Sheets

OTHER PUBLICATIONS

Drea, John T., "The Effects of Winning, Weather, Scheduling, and Promotion On Atendance At NCAA Division II Men's College Basketball Games" Southern Marketing Association (Published 1995) p. 287-290.*

Weatherford, L.R. "Using Prices More Realisticaly As Decision Variables In Perishable-Asseet Revenue Management Problems" Journal of Combinatorial Optimization vol. 1, No. 3 (Oct. 1997) p. 277-304.*

Belobaba, P.P. "Survey Paper: Airline Yield Management An Overview of Seat inventory Control" Transportation Science, vol. 21, No. 2, (May 1987), p. 63-73.*

Weatherford, L.R. "A Taxonomy and Research Overview of Perishable-Asset Revenue Management: Yield Management, Overbooking, and Pricing" Operations Research, vol. 40, No. 5, Sep.-Oct. 1992, p. 831-844.*

* cited by examiner

Availability Control

P5 – Upper Box

| Fare Name | Current Status | New Status | Optimal Status |
|---|---|---|---|
| Comp | Open | ☑ | Closed |
| Reg/Grp | Open | ☑ | Open |
| Early Discount | Open | ☑ | Closed |
| Package Plan | Open | ☑ | Closed |
| Price Freeze | Open | ☑ | Closed |
| Senior Discount | Open | ☑ | Open |
| Family Discount | Open | ☑ | Closed |

700A

Save

FIG. 6

EVENT REVENUE MANAGEMENT SYSTEM

CROSS REFERENCE TO RELATED APPLICATIONS

This application claims the benefit of U.S. Provisional Application No. 60/210,354, which was filed on Jun. 9, 2000, and which is hereby incorporated by reference.

BACKGROUND OF THE INVENTION

1. Field of the Invention

The present invention relates to an event revenue management system for forecasting demand for an event and optimizing ticket pricing and allocation based on historical and current data to manage revenue and to maximize profit from the event.

2. Discussion of the Related Art

Generally, ticket prices are fixed and published well before an event takes place. For any event, there are typically several price categories or seat categories associated with it. For each price category, there may also be several discount categories, such as an advance-purchase discount or senior discount.

To maximize profit from each event, it is desirable to better manage the price and availability of ticket sales. For example, it may be desirable to close from sale low margin ticket categories when a section has high demand. It may be desirable to upgrade purchases for an over-subscribed section by filling purchases that would have gone unsold.

Recently, there has been a growing interest in revenue management systems. Revenue management is the science of using past history and current data to manage revenue and profit for various events.

With the rapid advance of computer technology, it is now possible to collect and store a large amount of historical data and track current booking levels. Further, using computers, our abilities to analyze historical and current data have improved significantly.

Yet, existing revenue management systems suffer from many shortcomings. Such shortcomings include: (1) they do not fully take into account factors affecting revenue and profit, such as timing of an event, availability of resources within an event, ancillary revenue, and discount offers available for each resource; (2) they fail to fully utilize historical data including unconstrained historical demand; (3) they do not adequately support user inputs; (4) they do not fully take into account current booking information for future events; and (5) they lack an adequate ticket pricing optimization capability.

Thus, there is a need for an event revenue management system that is capable of effectively analyzing historical and current data to accurately forecast demand for various types of tickets for an event and optimize ticket pricing to manage revenue and maximize profit from the event.

SUMMARY OF THE INVENTION

Accordingly, the present invention is directed to a method and system for managing event revenue. Specifically, the present invention is directed to a method and system for managing event revenue by forecasting future demand of an event based on parameters, historical data, and current data, and by optimizing ticket pricing based on the forecasted future demand.

To achieve these and other advantages and in accordance with the purposes of the present invention, as embodied and broadly described herein, a system for managing revenue for an event having event parameters includes means for initializing forecasting parameters. The event parameters include timing, resource, and discount categories. The system further includes means for aggregating historical data using the forecasting parameters to generate initial forecast statistics, taking into account the event parameters. In addition, it includes means for forecasting demand by updating the initial forecast statistics based on current data and means for optimizing pricing of the event.

In another aspect, the invention includes a method for managing revenue for an event. The event has event parameters, including timing, resource, and discount categories. The method includes initializing forecasting parameters and aggregating historical data using the forecasting parameters to generate initial forecast statistics, taking into account the event parameters. The method also includes forecasting demand by updating the initial forecast statistics based on current data and optimizing pricing of the event.

In yet another aspect, the invention includes a method of managing revenue for a plurality of events. The method includes loading historical data and event information regarding each of the plurality of events. The event information includes venue configuration, event, date and time, resource category, and discount category information. The method also includes, for each event in the plurality of events, initializing forecasting parameters and generating initial forecast statistics by aggregating appropriate historical data using corresponding forecasting parameters taking into account corresponding event information. It further includes, for each event in the plurality of events, updating corresponding initial forecast statistics based on appropriate current data and optimizing pricing for each event in the plurality of events.

In a further aspect, the invention includes an event revenue management network for managing revenue for an event. The event has event parameters including timing, resource, and discount categories. The network includes an initialization module that initializes forecasting parameters and an aggregation module that aggregates historical data using the forecasting parameters to generate initial forecast statistics taking into account the event parameters. The network also includes a forecast module that forecasts demand by updating the initial forecast statistics based on current data and an optimization module that optimizes pricing of the event.

In yet a further aspect, the invention includes a computer program product for managing event revenue. The event has event parameters including timing, resource, and discount categories. The computer program product includes computer readable program codes configured to: (1) initialize forecasting parameters; (2) aggregate historical data using the forecasting parameters to generate initial forecast statistics, taking into account the event parameters; (3) forecast demand by updating the initial forecast statistics based on current data; and (4) optimize pricing of the event. It also includes a computer readable medium containing the computer readable program codes.

The invention further includes a mechanism configured to manage revenue of an event. The event has event parameters including timing, resource and discount categories. The mechanism includes mechanisms configured to (1) initialize forecasting parameters; (2) aggregate historical data using the forecasting parameters to generate initial forecast statistics, taking into account the event parameters; (3) forecast demand by updating the initial forecast statistics based on current data; and (4) optimize pricing of the event.

Finally, in another aspect, the invention includes a program storage device readable by a machine, tangibly embodying a program of instructions executable by a machine to perform method steps of managing event revenue. The event has event parameters including timing, resource and discount categories. The method steps include initializing forecasting parameters and aggregating historical data using the forecasting parameters to generate initial forecast statistics, taking into account the event parameters. They also include forecasting demand by updating the initial forecast statistics based on current data and optimizing pricing of the event.

Additional features and advantages of the invention are set forth in the description that follows, and in part are apparent from the description, or may be learned by practice of the invention. The objectives and other advantages of the invention are realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIGS. 5–7 are output images from the system of FIG. 1 in accordance with a preferred embodiment of the present invention.

DETAILED DESCRIPTION OF THE PREFERRED EMBODIMENTS

Reference is now made in detail to the preferred embodiment of the present invention, examples of which are illustrated in the accompanying drawings.

Event revenue management may be described as being concerned with inventory control rather than pricing control. The inventory control for event revenue management may be defined as a process of saving seats within each venue resource group for later-bookings and/or higher paying event attendants, wherein a venue resource group ("resource group" or "resource category") might be a certain section of seats within a venue that has similar characteristics such as a retail price per seat, distance from the stage or field, or access to amenities.

An event may be defined by the combination of a venue configuration, date, time, and/or event type. An event may be singular or a part of series. If it is a single event, there is preferably at least one historical event that may be considered representative of the single event. If there are multiple events, the attendance preferably follows predictable patterns based on time of day, day of week, and/or season.

Market segmentation may be achieved through discount fares within a resource group. In other words, within a resource group, different prices may be charged for different buyer segments. Further bookings may be controlled for different segments. The profit-increasing capability of an event revenue management system may be dependent on the ability of a ticket manager or management system to open and close discount fare categories within a resource group. By closing a discount fare category for high demand events, greater profit may be obtained in light of price, discount, cost, and ancillary revenue.

An event revenue management system of the present invention may be capable of taking into account various factors or categories, including resource categories, discount categories, and timing categories. Descriptions of the preferred embodiment of the present invention focus on revenue maximization for an event through demand forecasting and optimal ticket pricing. Based on the descriptions, those skilled in the art will appreciate that the present invention may be used in many different areas, including pricing of hotel rooms, airline seats, cruise tickets, tour tickets, and concert tickets. As such, the present invention is not limited to a specific application area.

Figure 1:
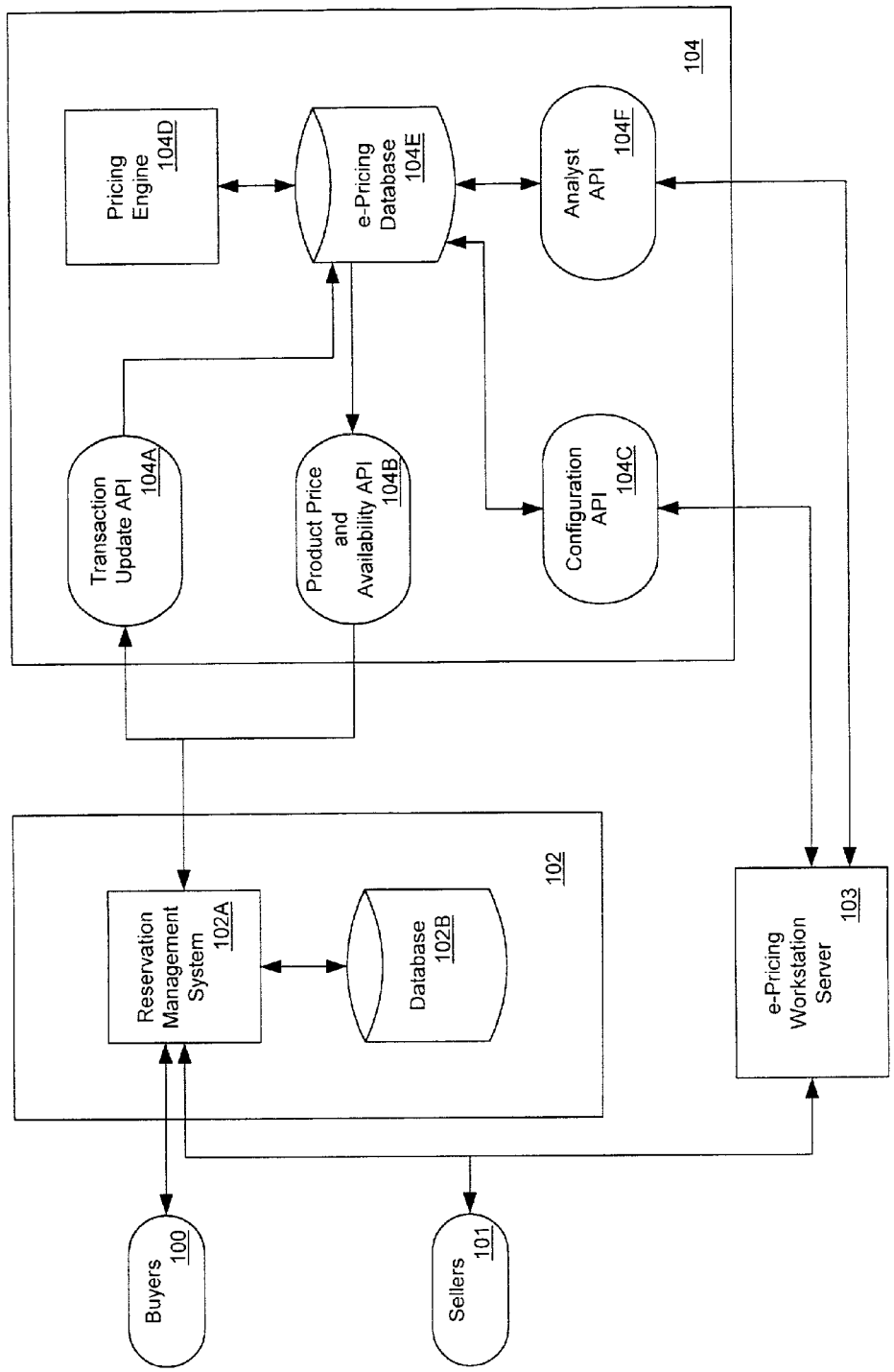
FIG. 1 is a schematic diagram depicting one use of an event revenue management system of the present invention.

FIG. 1 is a schematic diagram depicting one use of an event revenue management system of the present invention. Specifically, both buyers 100 and sellers 101 have an access to a reservation system 102. The reservation system 102 includes a reservation management system 102A used to purchase tickets and/or inquire availability of tickets, for example. It also has a database 102B maintaining such information as inventory and sales.

The reservation management system 102A retrieves information from database 102B and from an event revenue management system 104. It also provides information to the database 102B so that the database 102B contains current availability and control information. To simplify an interface between the reservation system 102 and an event revenue management system 104, a transaction update application programming interface ("API") 104A and product price and availability API 104B are provided in the revenue management system 104. The transaction update API may update information in an e-pricing database 104E, which is used by a pricing engine 104D to forecast demand and/or recommend optimal pricing, to incorporate current booking information, etc. The product price and availability API 104B may also be used to retrieve information from the e-pricing database 104E in response to a request issued from the reservation management system 102. Operations performed by the pricing engine 104D are described in detail below.

The sellers 101 may also have an access to an e-pricing workstation server 103, which also communicates with the event revenue management system 104 through a configuration API 104C and an analyst API 104F. Sellers, using the e-pricing workstation server 103 may retrieve demand forecast information calculated by the pricing engine 104D. They may also provide an input to the pricing engine 104D by setting forecasting and/or optimization parameters for storage in an e-pricing database 104E. They may also accept or reject optimization recommendations issued by the pricing engine 104D.

Figure 5:
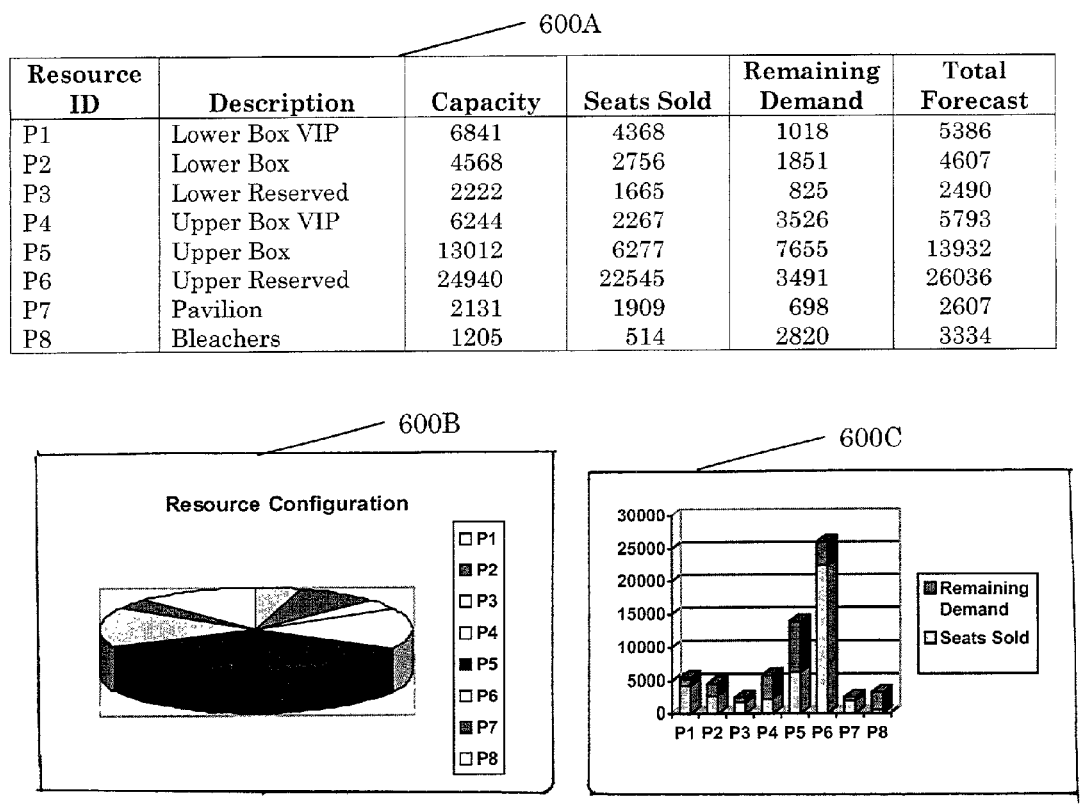
Figure 7:
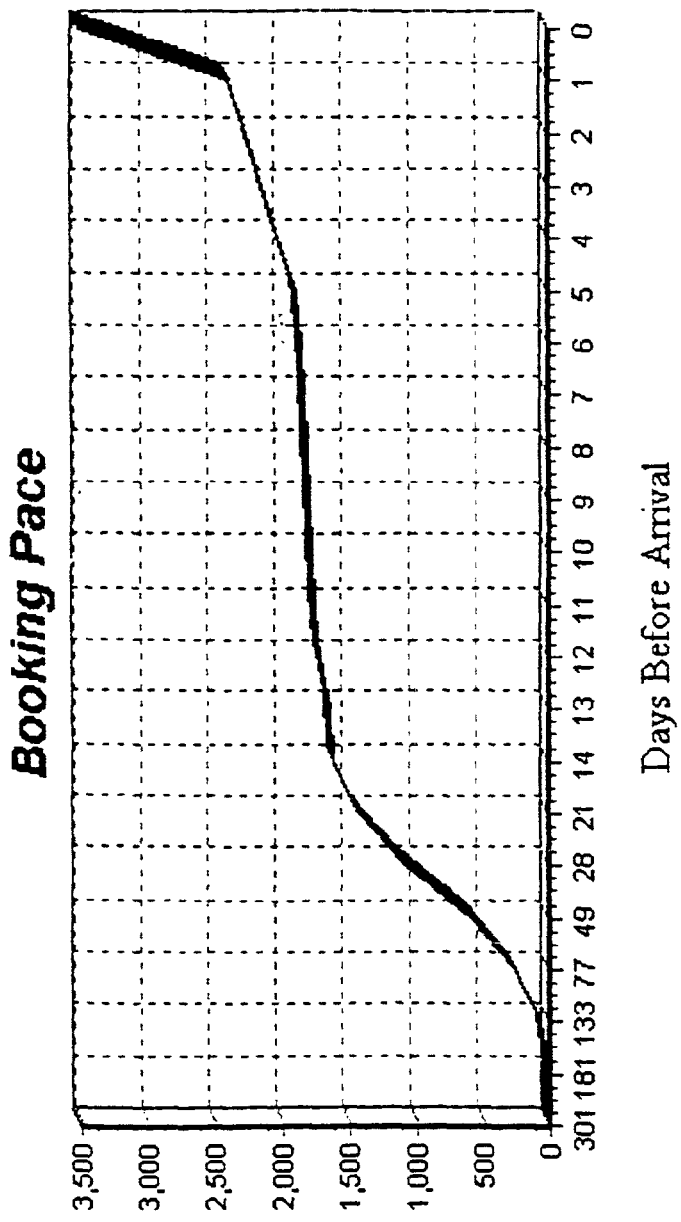
Figure 7:

FIGS. 5–7 are outputs that may be produced by the revenue management system 104. Specifically, FIG. 5 contains a table 600A containing a description, capacity, seats sold to-date, remaining demand, and total forecast for resources P1–P8 for an event. It further includes a pie chart 600B showing resource configuration and a bar graph 600C showing forecast overview based on seats sold and remaining demand. FIG. 6 provides availability control information, which may be used to control event ticket sales to optimize the event. Specifically, a table 700A shows a current status of various fare names (or discount categories) associated with a resource category "P5-Upper Box." It also provides optimal status for the fare names as determined by the system. A user may change a status of each fare name to optimal status in order to manage revenue and maximize profit from an event. FIG. 7 contains a graph showing booking pace for a resource category "P5-Upper Box."

Figure 2:
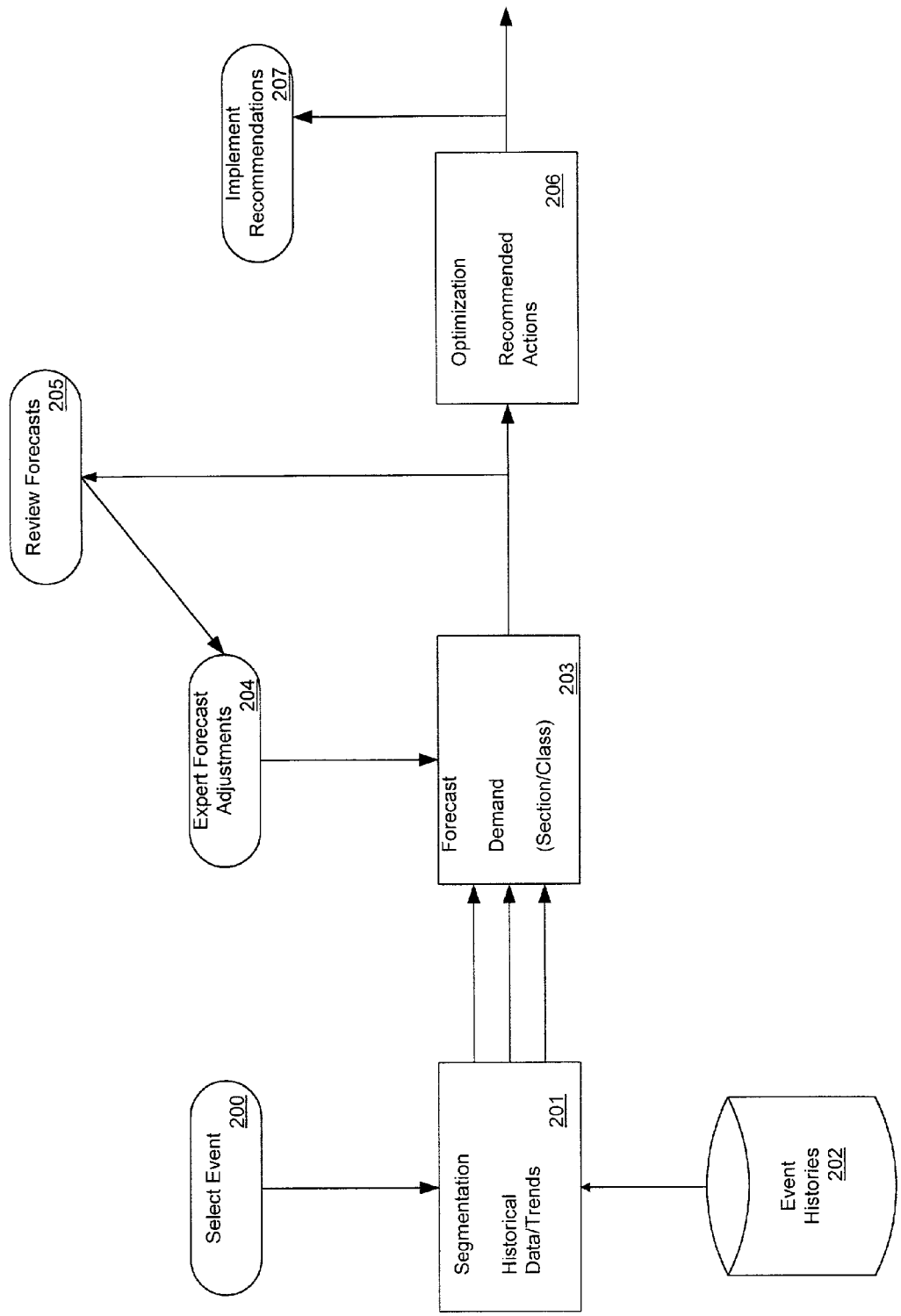
FIG. 2 is a logical block diagram depicting one embodiment of an event revenue management system of the present invention.

FIG. 2 is a logical block diagram depicting one embodiment of an event revenue management system of the present invention. Specifically, the system includes a database 202 including event histories. Using an event-selection module 200, an event is selected. A user (or preferably a configuration specialist) may select an event using the module 200. For any event, various factors may be analyzed at a data-loading and initialization module 201. Specifically, it may consider market segmentation information, such as resource and discount categories. It may also consider historical data, current data, and information regarding future trends.

Historical data may be obtained from the event history database 202. It is preferable that records of historical events that are similar to events at issue are considered when forecasting demand for the event. Further, it is preferable that for historical data to be complete having only few or no missing data. Records of historical and future data may be formatted based on a user specification.

The data-loading and initialization module 201 may be used to access the event history database 202 to obtain desired data. Operations performed by the data-loading and initialization module 201 are described below in detail.

A forecast module 203 uses outputs of the data-loading and initialization module 201. The forecast module 203 may also accept expert forecast adjustments using a module 204. Such expert forecast adjustments may be made by a configuration specialist based, for example, on previously calculated forecast data and other information that he or she deems relevant, using the expert adjustment module 204. The forecast module 203 may be used to forecast future bookings, future cancellations, and unconstrained demand. Future bookings and future cancellations may be defined as the number of ticket sale transactions prior to an event and the number of ticket return transactions prior to an event, respectively. Unconstrained demand may be defined as the net number of tickets (i.e., the number of bookings less the number of cancellations) that would be sold in each resource with no inventory availability or sales restrictions in place. Such restrictions may include the number of seats in a section/class or the availability of discount for a seat. Operations performed by the forecast module 203 are described below in detail.

Outputs of the forecast module 203 may be reviewed, for example by a configuration expert, using a forecast review module 205. As stated in the previous paragraph, a configuration specialist may make expert adjustments using the module 203 after viewing forecasts using the module 204.

Based on outputs from the forecast module 203, an optimization module 206 may recommend actions to be taken to optimize revenue. For example, for any given event, it might recommend an optimal status for each discount category within a resource category. Specifically, each discount category may be assigned a status of open, closed, or flexible. The optimization module 206 may recommend a change in the current status of each discount category after performing optimization operations. Operations performed by the optimization module 206 are described below in detail.

Finally, recommendations given by the optimization module 206 may be implemented using a recommendation implementation module 207. A decision as to whether or not to implement recommendations may be made, for example, by a configuration specialist. Alternatively, recommendations by the optimization module 206 may be implemented automatically.

Figure 3:
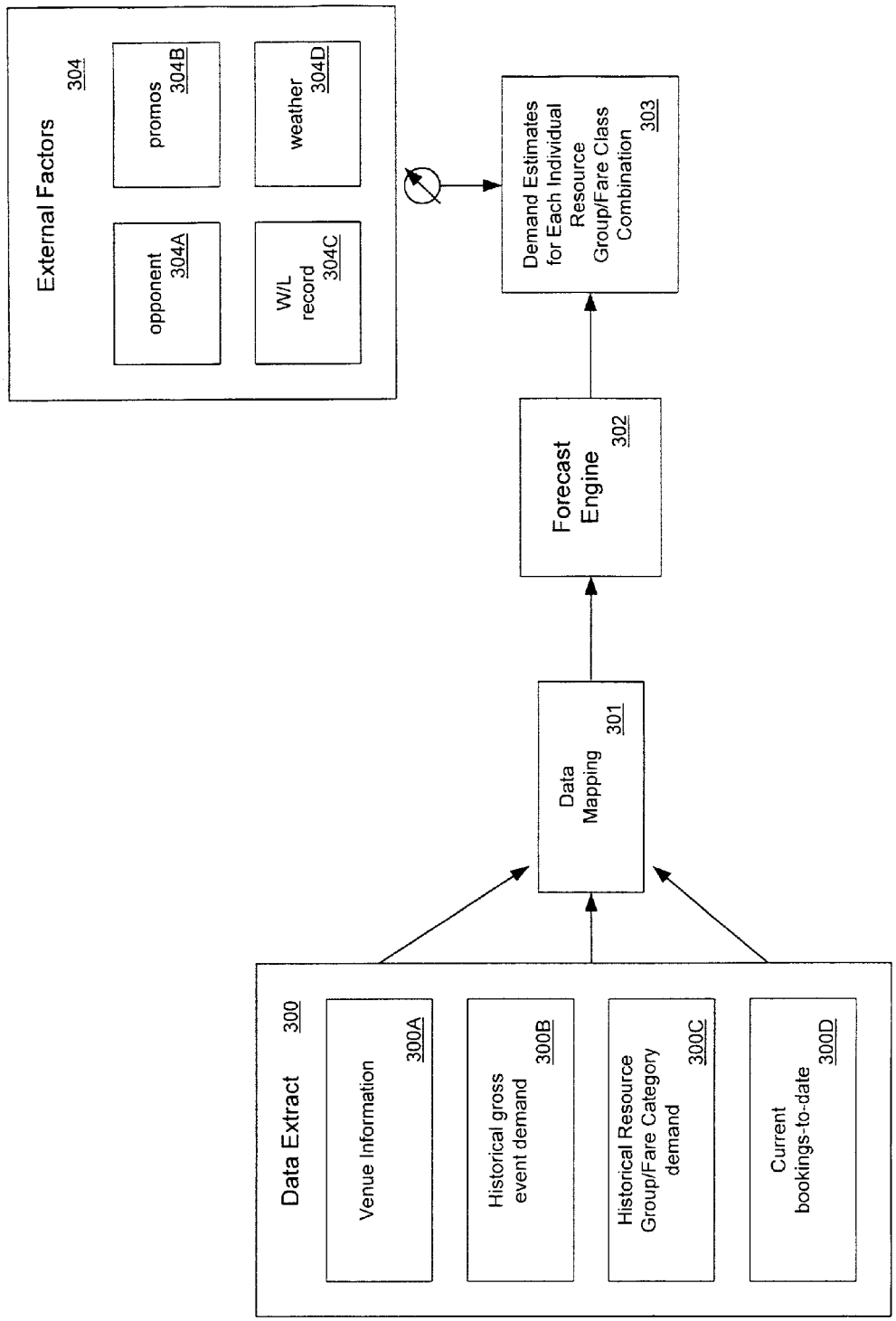
FIG. 3 is a logical block diagram depicting operational aspects of a preferred embodiment of an event revenue management system of the present invention.

FIG. 3 is a logical block diagram depicting a preferred embodiment of an event revenue management system of the present invention. The embodiment of FIG. 3 may be used to forecast future bookings, future cancellations, and unconstrained demand. The system of FIG. 3 may take into account various data, including bookings (and cancellations) to-date, day of week consumption, time of day consumption, and day of week purchase. Specifically, it may take into account current data, including ticket transaction history (or "booking history") for a specific event such as bookings and cancellations to-date. The day of week consumption corresponds to the date of the event, while the time of day consumption corresponds to the time of the event. Finally, the day of week purchase corresponds to the day when the ticket is sold.

Typically, it takes days or weeks to sell out an event. A booking history for an event typically shows consistent patterns.

A data extraction module 300 may be used to obtain input data that may be used in a data mapping 301 and/or forecast engine 302 module. Specifically the data extraction module 300 may access a database to obtain venue information 300A, historical gross event demand 300B, historical resource group/fare category demand 300C, and current bookings-to-date 300D. The venue information 300A may include information related to capacity, sections, discounts, and fares. The historical gross event demand 300B may include aggregate event-day data of prior events. The historical resource group/fare category demand 300C may include resource group/fare class event-day data from prior events. Finally, the current bookings-to-date 300D may include information regarding all ticket transactions for a future event.

Data extracted using the module 300 is then processed by a data-mapping module 301. Operations of the data-mapping module 301 may include selecting a virtual event category to which an event at issue resembles and obtaining initial forecast information, such as fractional build curve, forecast, and remaining data forecast, based on information obtained by the data extraction module 300. Operations of the data-mapping module 301 are described below in more detail.

A forecast engine 302 is used to produce demand estimates. For example, forecast engine 302 may determine the number of future ticket transactions, including future bookings and cancellations, for an event. It may also include remaining demand forecast.

A module 303, FIG. 3 may be used to generate demand estimates for each individual resource/fare combination. Specifically, it may generate, the total event unconstrained demand for each resource and fare category, stated, for example, in terms of mean and variance for each upcoming individual event. It may also generate actual booking pace to-date and future predicted booking pace for each resource and fare category. Actual booking pace to-date and future predicted booking pace may be placed in days-until-event bins.

As shown in a module 304, FIG. 3, there are various external factors that may cause an increase or decrease in demand. Such factors may include an opponent (or competition) 304A, promotions (304B), W/L record (i.e., win/loss record) (304C), and weather (304D). Such factors may be used to adjust demand estimates of the output module 303.

Next, one preferred embodiment of an event revenue management system of the present invention is described in detail. In this embodiment, the event revenue management system includes three main modules—a data-loading module, a data-initialization module, and a forecasting module. Each module is now described in detail.

First, the data-loading module loads historical data into the database. In addition, it may load information regarding venue configuration, event, date and time, resource category, and discount category for future events.

As to information regarding venue configuration, it may include information regarding venue name (for example, San Jose Arena), venue configuration name (for example, San Jose Arena—Hockey or San Jose Arena—Circus), venue configuration display name, venue configuration description (for example, a setup for a circus or a hockey game), and/or venue configuration capacity. In addition, it may include information regarding a seat and/or street map. As to information on venue itself, one may include a venue name, venue display name, capacity, address, and telephone number.

As to resource category information, it may include resource name (for example, a lower box or bleacher), resource display name, resource virtual description (for example, lower box seats on left side of field for baseball game), resource capacity, concession revenue and cost, and upgrade information. Discount information may include corresponding resource name, discount class name, timing category, discount qualification information, and any limitations.

Appendix I provides one example of data that may be loaded by the data-loading module of the present invention. Specifically, the example sets forth fields of eight variables, VenueRaw, VenueConfigured, VenueResourceVirtual, ResourcePriceDiscountClass, EventResource, ValueClass, EventBookingTemp, and User. One of ordinary skill in the art will appreciate that the tables in Appendix I are merely examples and information contained in historical data may easily be modified. Thus, the examples in Appendix I should not be construed to limit the present invention.

The data-initialization module may be used to specify forecasting parameters and historical data used at a forecasting stage. In this embodiment, a configuration specialist (or a user) may be allowed to initialize various forecasting parameters, such as an event type, venue configuration, forecast arc length ("FA"), timing category ("TC"), and epoch lengths. The FA may represent the number of weeks that serves as the basis for the rolling average fractional build curves and forecast for seasonal events. The TC may be used to aggregate history—for example, historical data may be aggregated by time of day, day of week, both time of day and day of week, or some other measure.

Further, a configuration specialist may be allowed to specify whether an event type is sequential. As to sequential events, the configuration specialist may be asked to enter the date of the first event, which may be used in calculating a corresponding forecast window number ("FWN"). He or she may be allowed to approve and/or modify historical data to be used as a basis for forecasting.

Figure 4:
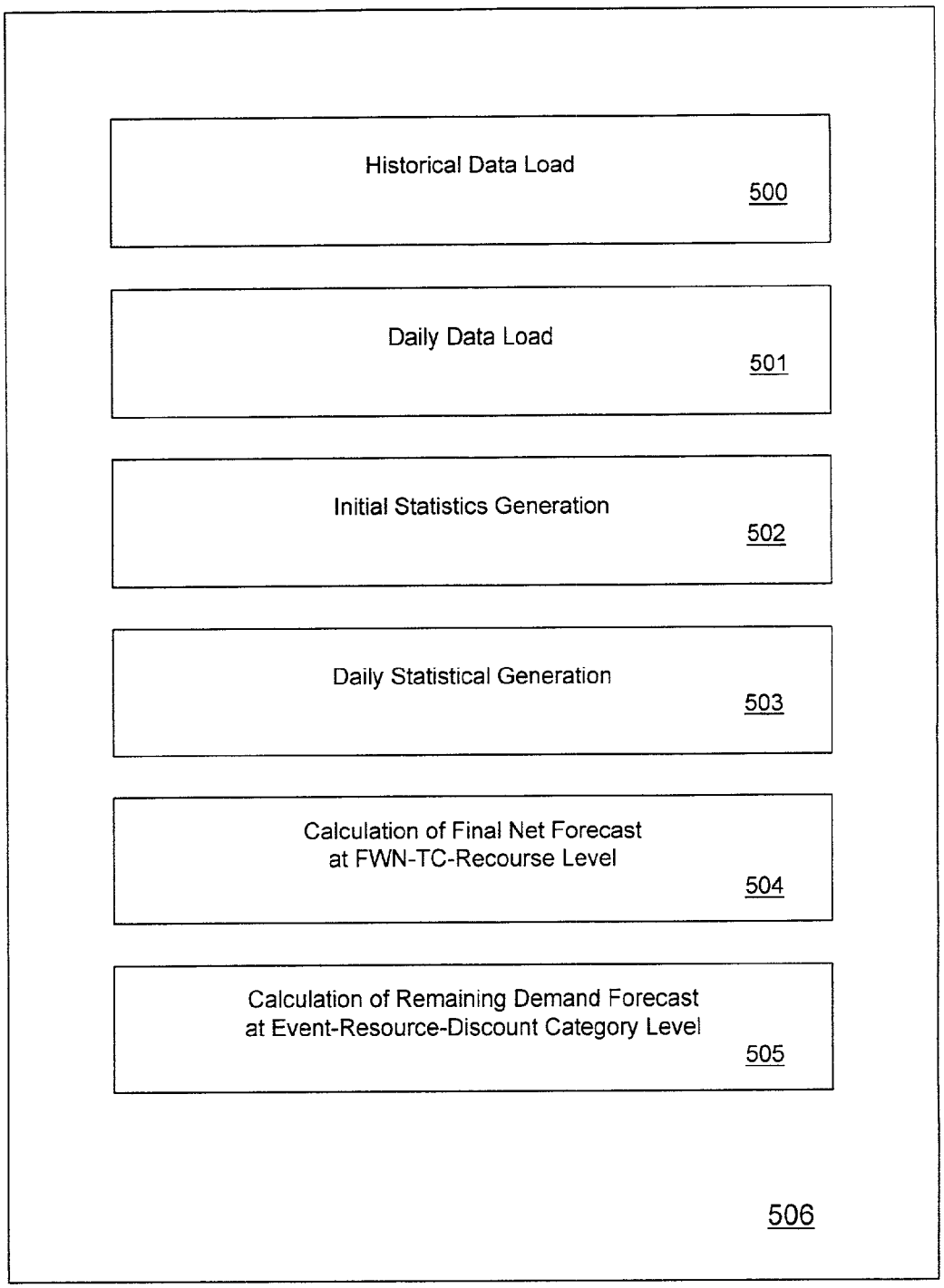
FIG. 4 is a logical block diagram showing a forecast module of an event revenue management system of the present invention.

In a forecast module (or a forecast engine) such as that shown in FIG. 4 of the present invention, a forecast engine 506 may be considered to include at least six modules: a module to load historical data 500, a module to load daily data 501, a module to generate initial statistics 502, a module to generate daily statistics 503, a module used to calculate final net forecast at FWN-TC-resource level 504, and a module used to calculate remaining demand forecast at event-resource-discount-category level 505. Those of ordinary skill in the art will appreciate that these modules are provided to describe some of the operations performed by a forecast engine of a revenue management system of the present invention. They will also appreciate that the present invention may be implemented by using these and other modules—i.e., these modules may be combined, implemented outside a forecast engine, or replaced with other modules to implement the present invention. Thus, the illustrative embodiment in FIG. 4 should not be construed to limit the present invention Table 1 below provides a list of variables used by the forecast engine of FIG. 4 in forecasting. One of ordinary skill in the art will appreciate that variables listed in Table 1 are provided as an example and the present invention can be implemented using various combinations of variables in Table 1 or additional variables, without departing from the scope of the invention. As such, modifications and substitutions by one of ordinary skill in the art are considered to be within the scope of the present invention.

TABLE 1

| ID | Description |
| --- | --- |
| FWN | Forecast Window Number; identifies the time span in the future for calculation of forecasts |
| HWN | Historical Window Number; identifies the time span in historical data that will be used to generate forecasts |
| FA | Maximum number of units (weeks) that will be used in historical rolling averages |
| TC | Timing Category |
| R | Resource |
| $Bbkngs_{e,r,dc}$ | Net bookings at the event, resource, discount category level |
| $IDC_{tc,r}$ | Ideal set of discount categories at the timing category resource level; To be used to calculate discount category statistics |
| EH | Set of all historical events |
| EF | Set of all future events |
| EC | Set of all completed events in the current season which have not yet gone through the daily update process; Once used to update statistics, an event becomes a member of EH. |
| Fs | Flexibility status of price discount category. If true, then the optimization can change the availability status, if false, the optimization cannot change the status. |
| $Dsc\_ct\_stat_{tc,r}$ | Discount category stats at the timing category resource level |
| EID | Each epoch date is assigned a sequential ID to be used as a reference in the database. |
| ESD | The fractional build curve consists of a series of epoch start dates, representing the days prior to a specified event. |
| Dys_Prior | The number of days prior to a specified event |
| $Frc\_Bld_{tc,r}$ | Fractional build curve at the timing category resource level |
| $\alpha$ | Historical smoothing constant used during initialization to determine weights for rolling averages |

TABLE 1-continued

| ID | Description |
|---|---|
| $\omega_{cj}$ | The normalized weight for the historical observation that is \|j\| FWN units away from the target FWN |
| $\beta$ | Daily update smoothing constant used during the daily update process to incorporate data from just completed events into statistics |
| $\omega_\beta$ | The normalized weight to incorporate new data in the daily update process |
| Fnl_Fcst$_{tc,r}$ | Final unconstrained remaining demand forecast at the event, resource, discount category level |
| Fcst_Rem_Dmd$_{e,r,dc}$ | Net unconstrained remaining demand forecast at the event, resource, discount category level |
| Post Date | a defined date subsequent to a specified event |

The forecast engine may include a data pooler, which takes historical data and aggregates it according to the parameters set during the initialization process. The outputs of the data pooler may form the basis of a forecast process. Results of the initial data pooling process may be output to database tables. Such database tables may be named, based on data it contains, for example as Event, EventResource, ValueClass, EventBookingsHistorical tables.

Depending on the forecasting needs, it may be preferable to cycle through one or more future events to produce, for example, net unconstrained demand and associated standard deviation for each future event-resource-price-discount category forecasts. In pooling data, the forecast engine typically processes all historical data. It may, however, retrieve only the historical data with event type matching the event-venue that is being initialized and/or forecasted.

Calculations performed by the data pooler may include: aggregating net historical bookings by event name, event date, resource, price discount class, point of sale, and booking date, determining TC and FWN during pooling process, writing back information to various tables such as Event and ValueClass tables, populating fields that are not relevant for historical data use, such as BuyupProbability and UpgradeLimitNum in the EventResource table, with "0."

The data pooler may be considered to take data-load and event-type initialization as inputs and generate fractional build curve, forecast, remaining demand forecast, and optimization. Examples of calculations performed by the data pooler are now described.

The data pooler, by aggregating historical data, may generate initial statistics. Such statistics may include: discount category decomposition statistics at the TC-resource-discount category level, fractional build curve statistics at the TC-FWN-resource level, final net forecasts at the TC-FWN-resource level, and remaining demand forecast at the event-resource-discount category level.

The data pooler may choose to use pre-calculated (or pre-defined) values for initial discount category statistics. Alternatively, it may calculate initial discount category statistics. For example, the initial discount category statistics may be calculated as follows. First, for each TC-resource, the discount categories defined in the ResourcePriceDiscountClass table in the database may be determined. This ideal set of discount categories per resource may be called, $IDC_{tc,r}$. Second, for each resource, the historical events from the set of all historical events may be selected, such that the combination of discount categories for an event-TC-resource may be equivalent to the IDC for that TC-resource.

This operation may be performed for all timing categories and resources as shown in Equation (1).

$$eh\_idc_{tc,r} = eh \in EH \ni dsc\_ct_{eh,tc,r} = IDC_{tc,r}, \forall tc \in TC, r \in R \quad (1)$$

Third, for each TC-resource-discount category, an operation described by Equation (2) may be performed:

$$bkngs_{tc,r,dc} = \sum_{eh \in eh\_idctc,r} bkngs_{eh,tc,r,dc}, \quad (2)$$

$$\forall tc \in TC, r \in R, dsc\_ct \in IDC_{tc,r}$$

Fourth, for each TC-resource, the discount categories may be added as follows:

$$bkngs_{tc,r} = \sum_{dc \in IDC_{tc,r}} bkngs_{tc,r,dc}, \forall tc \in TC, r \in R \quad (3)$$

Fifth, for each TC-resource, the total number of net bookings in each discount category may be divided by the total number of net bookings in the given resource.

$$dsc\_ct\_stat_{tc,r,dc} = \frac{bkngs_{tc,r,dc}}{bkngs_{tc,r}}, \forall tc \in TC, r \in R, dc \in IDC_{tc,r} \quad (4)$$

Sixth, the calculated fraction, $dsc\_ct\_stat_{tc,r,dc}$, may be stored.

The data pooler may also assign FWNs by performing the following calculations for future events to be forecasted and/or optimized. First, the units of the FWN are determined. For example, FWN may be defined in terms of weeks. Second, FWNs are altered depending on the unit selected. For example, a change to the FWN may occur on Monday, for the week-unit, on the $1^{st}$ for the month-unit, and during down-period of the night for the day-unit. Third, the calendar equivalent of the FWN for future events may be determined. For example, if the FWN is in terms of weeks, the week of the year (a week starting on Monday) in which the first event occurs may be determined. Fourth, the first event may be assigned to FWN_1. Fifth, a future event may be assigned a FWN by subtracting the first event's calendar FWN from future event's calendar FWN and adding 1 as shown in Equation (5).

$$FWN_{ef} = (Calendar\_FWN_{ef} - Calendar\_FWN_1 + 1),$$
$$\forall ef \in EF \quad (5)$$

The data pooler may also assign HWNs to historical events. Specifically, the data pooler may first determine the units of the HWN. Typically, units of HWN may be the same as units of FWN. Rules associated with FWNs may also apply to HWNs. Second, the data pooler may determine the calendar equivalent of the HWN for historical events. Third, the data pooler may assign the first historical event to HWN_1. Fourth, the data pooler may assign other historical events an HWN by subtracting the first historical event's calendar HWN from each historical event's calendar HWN and adding 1 as shown in Equation (6).

$$HWN_{eh} = (Calendar\_HWN_{eh} - Calendar\_HWN_1 + 1),$$
$$\forall eh \in EH \quad (6)$$

The data pooler may calculate initial fractional build curve statistics at the FWN-TC-resource level. To calculate initial fractional build curve statistics, fractional build curves may be generated for each future combination of FWN-TC-resource specified in the future data. They may be generated from unconstrained historical data in the same TC and with HWN equal to the FWN of the event and plus/minus half the FA. The weeks at the beginning and end of the season may use what is available of the FA. For instance, the first week may use historical weeks 1–3, and the last week may use the last three historical weeks. Next, for each epoch id, total net bookings that have occurred thus far may be cumulated for all events in the same HWN-TC-resource.

$$bkngs_{eid(i),hwn,tc,r} = \sum_{dp \geq dpeid(i)} bkngs_{eh,hwn,tc,r,dp}, \quad (7)$$

$$\forall\, tc \in TC,\, r \in R,\, hwn \in HWN,\, eid \in EID$$

Then for each HWN-TC-resource, total net bookings may be determined as follows:

$$bkngs_{hwn,tc,r} = bkngs_{eid(0),hwn,tc,r},\, \forall tc \in TC,\, r \in R,\, hwn \in HWN \quad (8)$$

A fractional build may be calculated by dividing the cumulative value at each break point by the total.

$$\text{frac\_bld}_{eid(i),hwn,tc,r} = \frac{bkngs_{eid(i),hwn,tc,r}}{bkngs_{hwn,tc,r}}, \quad (9)$$

$$\forall\, tc \in TC,\, r \in R,\, hwn \in HWN,\, eid \in EID$$

Subsequently, a fractional build curve for future FWN-TC may be calculated by taking a weighted average of the historical curves from the applicable HWN-TC. The weights may be calculated by normalizing the values found by the following equation: $\{a \times (1-a)^{(|j|-1)}\}$, where a is a stored smoothing constant and j is the number of weeks off the target week in question. A different weight may be assigned to a HWN for each FWN it is used in. Specifically, equations (10)–(12) may be used to calculate a fractional build curve $$j_{fwn,hwn} = (fwn - hwn) \begin{cases} j_{\max} = truncate\left(\frac{FA}{2}\right) \\ j_{\min} = (-1)*truncate\left(\frac{FA}{2}\right) \end{cases} \quad (10)$$

$$\varpi_{j_{fwn,hwn},tc,r} = \frac{(a \times (1-a))^{(|j_{fwn,hwn}|-1)}}{\sum_{j\min}^{j\max}\left(a \times (1-a)^{(|j_{fwn,hwn}|-1)}\right)}, \quad (11)$$

$$\forall\, j,\, tc \in TC,\, r \in R$$

$$\text{frac\_bld}_{eid(i),fwn,tc,r} = \sum_{hwn}\left(\omega_{j_{fwn,hwn},tc,r} \times \text{frac\_bld}_{eid(i),hwn,tc,r}\right) \quad (12)$$

$$\forall\, tc \in TC,\, r \in R,\, fwn \in FWN,\, eid \in EID$$

Finally, these values may be stored as the fractional build curve statistics.

The data pooler may be used to determine initial final net forecast at the FWN-TC-resource level. First, the data pooler may calculate the average unconstrained net demand for all historical events in each HWN-TC resource by dividing the total net bookings from all events in a given HWN by the number of events as described in Equation (13).

$$avg\_bkgs_{hwn,tc,r} = \frac{bkngs_{hwn,tc,r}}{\sum_{eh \in hwn} i_{eh}}, \quad (13)$$

$$\forall\, tc \in TC,\, r \in R,\, hwn \in HWN$$

Second, the final net forecast for each future FWN-TC resource may be calculated by taking a weighted average of the historical averages from the applicable FWN-TC resource. The weights may be calculated by normalizing the values found by the following equation: $\{\alpha \times (1-\alpha)^{(|j|-1)}\}$ where $\alpha$ is a stored smoothing constant and j is the number of weeks off the target week in question. A different weight may be assigned to a HWN for each FWN it is used in.

$$j_{fwn,hwn} = (fwn - hwn)\begin{cases} j_{\max} = truncate\left(\frac{FA}{2}\right) \\ j_{\min} = (-1)*truncate\left(\frac{FA}{2}\right) \end{cases} \quad (14)$$

$$\varpi_{j_{fwn,hwn},tc,r} = \frac{(a \times (1-a)^{(|j_{fwn,hwn}|-1)})}{\sum_{j\min}^{j\max}\left(a \times (1-a)^{(|j_{fwn,hwn}|-1)}\right)}, \quad (15)$$

$$\forall\, j,\, tc \in TC,\, r \in R$$

$$\text{fnl\_fcst}_{fwn,tc,r} = \sum_{hwn}\left(\omega_{j_{fwn,hwn},tc,r} \times bkngs_{hwn,tc,r}\right), \quad (16)$$

$$\forall\, tc \in TC,\, r \in R,\, fwn \in FWN$$

Third, the data pooler may store back the values as the final net forecast.

The data pooler may calculate final net forecast by flexibility status at the FWN-TC-resource-flexibility status level. First, the final net forecast may be split by flexibility status. This may be done for the booking curve. Second, the price discount category statistics for the non-flexible price discount categories may be added.

$$\text{flex\_cat\_stat}_{tc,r,fst} = \sum_{fs="true"} \text{dsc\_ct\_stat}_{tc,r,dc,fs} \quad (17)$$

$$\forall\, tc \in TC,\, r \in R$$

Third, the final net forecast at the timing category-resource-flexibility status level may be calculated by multiplying the final net forecast by the fraction flexible and 1 minus the fraction flexible as shown in Equations (18) and (19).

$$\text{fnl\_fcst}_{fwn,tc,r,fs_t} = (\text{flex\_cat\_stat}_{tc,r,fs_t}) \times \text{fnl\_fcst}_{fwn,tc,r}),$$
$$\forall tc \in TC, r \in R, fwn \in FWN \quad (18)$$

$$\text{fnl\_fcst}_{fwn,tc,r,fs_f} = ((1-\text{flex\_cat\_stat}_{tc,r,fs_t}) \times \text{fnl\_fcst}_{fwn,tc,r}), \forall tc \in TC, r \in R, fwn \in FWN \quad (19)$$

The data pooler may calculate initial net remaining demand forecast at the FWN-TC-resource level. Specifically, it may apply the price category decomposition statistics to the final net forecast as follows.

$$\text{fnl\_fcst}_{fwn,tc,r,dc} = \text{fnl\_fcst}_{fwn,tc,r} \times \text{dsc\_ct\_stat}_{tc,r,dc} \forall tc \in TC, r \in R, fwn \in FWN, dc \in IDC_{tc,r} \quad (20)$$

In so doing, the data pooler may perform the following calculations at the event-resource-discount category level. First, it may determine the number of days prior using Equation (21).

$$dys\_prior_{ef} = (event\_date_{ef} - (post\_date + 1)), \forall ef \in EF \quad (21)$$

Second, it may determine the last epoch ID passed by each future event.

$$eid(ef) \ni dys\_prior_{eid(i-1)}$$
$$\leq dys\_prior_{eid(ef)} < dys\_prior_{eid(i)} \quad (22)$$

Third, it may determine the remaining fraction to book for each future event by interpolating the fractional build curve between the days-left value and the event's epoch ID as shown in Equation (23).

$$frac\_bld_{dp_{ef},r} = frac\_bld_{eid(ef),fwn,tc,r} - \quad (23)$$
$$\left( \frac{frac\_bld_{eid(ef),fwn,tc,r} - frac\_bld_{eid(ef+1),fwn,tc,r}}{dys\_prior_{eid(ef),fwn,tc,r} - dys\_prior_{eid(ef+1),fwn,tc,r}} \right) \times$$
$$(dys\_prior_{eid(ef),fwn,tc,r} - dys\_prior_{ef,r})$$

$$\forall \, eid \in EID, fwn \in TC, r \in R$$

Fourth, it may multiply the stored final net forecast by (1-booking fraction).

$$fcst\_rem\_dmd_{ef,r} = (1 - frac\_bld_{dp_{ef},r}) \times fnl\_fcst_{fwn,tc,r},$$
$$dc \forall ef \in EF, r \in R \quad (24)$$

Fifth, it may store back the calculated value as the remaining demand forecast.

The data pooler may calculate initial booking pace curve at the event-resource level as follows. First, booking pace curves may be generated for each future event at the resource level. The curve may consist of actual net bookings that have occurred to-date aggregated to epoch IDs and forecasted net bookings aggregated to epoch IDs. If the current date is between epoch IDs, the next epoch ID may be a mix of the accrued net bookings that have occurred since the last epoch ID and a forecast for the days that remain until the next epoch ID. In addition, the booking curve calculation may be split between those price-discount categories with non-flexible availability status and those with flexible availability status.

The second step in calculating the initial booking pace curve may include using $DP_{ef}$, the number of days prior for each future event, that was calculated for the remaining demand. Third, eid(ef), the epoch ID for each future event, which was calculated for the remaining demand, may also be used. Fourth, for each epoch ID, the incremental difference in the fractional build curve associated with the future events are determined using Equation (25).

$$\Delta frac\_bld_{eid(i),fwn,tc,r} = (frac\_bld_{eid(i-1),fwn,tc,r} - frac\_bld_{eid(i),fwn,tc,r}), \forall tc \in TC, r \in R, fwn \in FWN, eid \in EID \quad (25)$$

Fifth, the incremental difference in the fractional build curve between the current days prior and the event's epoch ID may be determined by subtracting fractional build percent found in the remaining demand calculations from the fractional build percent at the event's epoch ID.

$$\Delta frac\_bld_{eid(ef),r} = (frac\_bld_{eid(ef),r} - frac\_bld_{dp,ef,r}),$$
$$\forall r \in R, ef \in EF \quad (26)$$

Sixth, for each epoch ID greater than or equal to the future event's epoch ID, incremental net bookings of each future event at the resource-flexible status level may be cumulated.

$$inc\_bkngs_{eid(i),ef,r,fs} = \sum_{dp < dp_{eid(i+1)}}^{dp \geq dp_{eid(i)}} bkngs_{ef,r,dp,fs} \quad (27)$$

$$\forall \, ef \in EF, r \in R, eid \in (EID \geq eid(ef)), fs \in \{true, false\}$$

Seventh, for each epoch ID less than the future event's epoch ID, the forecasted incremental bookings may be determined by multiplying the final forecast by the incremental fractional build as shown in Equations (28) and (29). The resulting value may now be the bookings associated with the future epoch IDs.

$$inc\_fcst_{eid(i),fwn,tc,r,fs} = \Delta frac\_bld_{eid(i),fwn,tc,r} \times fnl\_$$
$$fcst_{fwn,tc,r,fs}, \forall eid \in EID, fwn \in FWN, tc \in TC, r \in R,$$
$$fs \in \{true, false\} \quad (28)$$

$$inc\_bkngs_{eid(i),fwn,tc,r,fs} = inc\_fcst_{eid(i),fwn,tc,r,fs},$$
$$\forall eid \in EID, fwn \in FWN, tc \in TC, r \in R, fs \in \{true, false\} \quad (29)$$

Eighth, for the future event's epoch ID, the incremental forecast for that epoch ID may be determined by multiplying the final forecast associated with the event by the incremental fractional build for the epoch ID.

$$inc\_fcst_{eid(ef),r,fs} = \Delta frac\_bld_{eid(ef),r} \times fnl\_fcst_{fwn,tc,r,fs},$$
$$\forall ef \in EF, r \in R, fs \in \{true, false\} \quad (30)$$

Ninth, for each future event, the incremental forecast for the event's epoch ID to the net bookings previously accrued in the event's epoch ID may be added. If epoch IDs are incremented daily, previous accrual may set to 0.

$$inc\_bkngs_{eid(ef),r,fs} = inc\_bkngs_{eid(ef),r,fs} + inc\_fcst_{eid}$$
$$(ef),r,fs, \forall ef \in EF, r \in R, fs \in \{true, false\} \quad (31)$$

Tenth, to calculate graphing values for booking curve for a future event, the incremental bookings from each epoch ID may be cumulated up to the next epoch ID.

$$book\_curve_{eid(i),ef,r,fs} = \sum_{j=max(eid)}^{eid(i)} inc\_bkngs_{eid(j),ef,r,fs}, \quad (32)$$

$$\forall \, eid \in EID, ef \in EF, r \in R, fs \in \{true, false\}$$

Finally, the booking curve statistics may be stored.

Next, the forecasting engine may include a daily statistics update process. Specifically, after each event completes, current date or information from that event may be used to update the statistics generated and stored during the initialization process. This process may occur, for example, each night after the daily data load is complete. The statistics updated may include discount category decomposition statistics at the TC-resource-discount category level, fractional build curve statistics at the TC-FWN-resource level, and final net forecasts at the TC-FWN-resource level, and remaining demand forecast at the event-resource-discount category level. In other words, the forecast engine may take current date or daily data load and statistics initialization as input to update daily statistics to improve forecasting and facilitate optimization.

Calculations involved in updating data statistic may include updating discount category statistics, updating fractional build curve statistics, updating final net forecast by flexibility status, updating net remaining demand forecast, and updating booking pace curve. These calculations are now described by way of examples.

First discount category statistics may be updated for the complete events using the following steps. First, for the resources whose combination of discount categories matches the ideal definition, Equation (33) may be used.

$$ec\_idc_{tc,r} = ec \in EC \ni dc_{ec,tc,r} = IDC_{tc,r}, \forall tc \in TC, r \in R \quad (33)$$

Second, if there is more than one event in EC, the final unconstrained net bookings for each resource-discount category may be added.

$$bkngs_{tc,r,dc} = \sum_{ec \in ec\_idc_{tc,r}} bkngs_{ec,tc,r,dc}, \quad (34)$$

$$\forall tc \in TC, r \in RC, dcs\_ct \in IDC_{tc,r}$$

Third, the final unconstrained net bookings for each resource over all discount categories may be summed.

$$bkngs_{tc,r} = \sum_{dc \in IDC_{tc,r}} bkngs_{tc,r,dc}, \quad (35)$$

$$\forall tc \in TC, r \in R$$

Fourth, the total number of net bookings in each discount category may be divided by the total number of net bookings in the given resource as shown in Equation (36).

$$dcs\_ct\_stat_{tc,r,dc} = \frac{bkngs_{tc,r,dc}}{bkngs_{tc,r}}, \quad (36)$$

$$\forall tc \in TC, r \in R, dc \in IDC_{tc,r}$$

Fifth, the stored discount category statistics for the same TC-resource may be updated by: (1) multiplying the completed event's discount category statistics by the stored smoothing constant for daily updates; (2) multiplying the stored discount category statistic by 1 minus the stored constant for daily updates, (3) adding the two together as shown in Equation (37), and (4) storing back the calculated values as the new discount category statistics.

$$dcs\_ct\_stat\_store_{tc,r,dc} = (dcs\_ct\_stat\_new_{tc,r,dc} \times \overline{\omega}_\beta) + (dcs\_ct\_stat\_old_{tc,r,dc} \times (1-\overline{\omega}_\beta)), \forall tc \in TC, r \in R, dc \in IDC_{tc,r} \quad (37)$$

Fractional build curve statistics may also be updated for completed events by performing the following operations. First, the net bookings may be cumulated to the epoch break points.

$$bkngs_{eid(i),fwn_{ec},tc,r} = \sum_{dp \geq dp_{eid(i)}} bkngs_{ec,fwn,tc,r,dp}, \quad (38)$$

$$\forall tc \in TC, r \in R, fwn \in FWN, eid \in EID$$

Second, for each FWN-TC-resource level, total net bookings may be cumulated.

$$bkngs_{fwn_{ec},tc,r} = bkngs_{eid(0),fwn_{ec},tc,r}, \forall tc \in TC, r \in R, fwn \in FWN \quad (39)$$

Third, the fractional build for completed events may be calculated by dividing the cumulative value at each break point by the total.

$$frac\_bld_{eid(i),fwn_{ec},tc,r} = \frac{bkngs_{eid(i),fwn_{ec},tc,r}}{bkngs_{fwn_{ec},tc,r}}, \quad (40)$$

$$\forall tc \in TC, r \in R, fwn \in FWN, eid \in EID$$

Fourth, the stored fractional build statistics for the same Epoch-FWN-TC-resource level may be updated by: (1) multiplying the completed event's fractional build statistics by the stored smoothing constant for daily updates, (2) multiplying the stored fractional build statistic by 1 minus the stored constant for daily updates, (3) adding the two together using Equation (41), and (4) storing back the calculated values as the new fractional build statistics.

$$frac\_bld\_store_{eid(i),fwn,tc,r} = (frac\_bld\_new_{eid(i)fwn_{ec},tc,r} \times \overline{\omega}_\beta) + (frac\_bld\_old_{eid(i),fwn,tc,r} \times (1-\overline{\omega}_\beta)), \forall tc \in TC, r \in R, fwn \in FWN, eid \in EID \quad (41)$$

Final net forecast may be updated for the completed events at the FWN-TC-resource level as follows. First, the average unconstrained net demand for all completed events in each FWN-TC level may be calculated by summing the bookings from all completed events in that FW and dividing by the number of events.

$$avg\_bkngs_{fwn_{ec},tc,r} = \frac{bkngs_{fwn_{ec},tc,r}}{\sum_{ec \in fwn} i_{ec}}, \quad (42)$$

$$\forall tc \in TC, r \in R, fwn \in fWN$$

Second, the new forecast input may be set to the average bookings just calculated.

$$fnl\_fcst_{fwn_{ec},tc,r} = avg\_bkngs_{fwn_{ec},tc,r}, \forall tc \in TC, r \in R, fwn \in fWN \quad (43)$$

Third, the stored final net forecast for applicable FWN-TC-resource level may be calculated as follows: (1) multiplying the completed event's final net forecast by the stored smoothing constant for daily updates; (2) multiplying the stored final net forecast by 1 minus the stored constant for daily updates; (3) adding the two together using Equation (44); and (4) storing back the calculated values as the new final net forecast.

$$fnl\_fcst\_store_{fwn,tc,r} = (fnl\_fcst\_new_{fwn_{ec},tr,r} \times \overline{\omega}_\beta) + (fnl\_fcst\_old_{fwn,tc,r} \times (1-\overline{\omega}_\beta)), 550\ tc \in TC, r \in R, fwn \in FWN$$

In addition, final net forecast by flexibility status at FWN-TC-resource-flexibility status level, net remaining demand forecast at FWN-TC-resource level, and booking pace curve at event-resource level may be updated. The same calculations as those performed for initialization by the data pooler may be used for updating each of them.

Next, optimization operations that may be performed by one embodiment of an event revenue management system of the present invention is described using an example. In this example, optimization is done by changing the status of discount categories of an event. Specifically, first, prior to optimization, a user (or a configuration specialist) may define the effective status of each discount category. The effective status may have a value of open, closed, or flexible.

Second, for each resource, a matrix may be generated such that each row of the matrix is an allowable combination of open and closed for each discount category. The matrix may preferably exhaust all possible combinations of open and closed that are allowed.

Third, an optimization module may be applied to each row k of the matrix. For example, an optimization module may perform the following six steps:

a) Send forecast of net remaining demand for each event-resource-price discount category with the availability status of the row, to the optimization module. This may be referred to as "forecast mean" or $fcst\_rem\_dmd_{k,ef,r,dc_{as}}$ b) Set variance of forecast mean, which may be referred to as "forecast variance" to the mean as follows:

$$var\_rem\_dmd_{k,ef,r,dc_{as}} = fcst\_rem\_dmd_{k,ef,r,dc_{as}} \quad (45)$$

c) Aggregate the forecast mean for all discount categories with availability status open $$agg\_fcst_{k,ef,r} = \sum_{dc_{as}=open} fcst\_rem\_dmd_{ef,r,dc_{as}} \quad (46)$$

d) Aggregate the forecast variance for all discount categories with availability status open $$agg\_var_{k,ef,r} = \sum_{dc_{as}=open} var\_rem\_dmd_{ef,r,dc_{as}} \quad (47)$$

e) Calculate the average profit per seat using configuration for row k by aggregating the profit per discount category times the forecast mean for the discount category and dividing by the aggregated resource mean $$agg\_profit_{k,ef,r} = \sum_{dc_{as}=open} (fcst\_rem\_dmd_{k,ef,r,dc_{as}} \times profit_{ef,r,dc}) \quad (48)$$

$$avg\_profit_{k,ef,r} = \frac{agg\_profit_{k,ef,r}}{agg\_fcst_{k,ef,r}} \quad (49)$$

f) The standard deviation equals the square root of the variance, which may be used in terms of the aggregate value $$agg\_st\_dev_{k,ef,r} = \sqrt{agg\_var_{k,ef,r}} \quad (50)$$

g) The first check is to determine if the aggregate forecast for row k is significantly less than the remaining capacity for the resource. This check may be performed by adding four times the standard deviation to the forecast mean and comparing it to the remaining capacity of the resource less 1 (to adjust for rounding error)

$$max\_dmd_{k,ef,r} = (agg\_fcst_{k,ef,r} + (4 \times agg\_st\_dev_{k,ef,r})) \quad (51)$$

$$undersell = \{true \text{ if}(rem\_cap_{ef,r}-1) \geq (max\_dmd_{k,ef,r})\} \quad (52)$$

h) If undersell equals true, the expected demand equals the aggregate mean, the expected profit equals the average profit per seat times the aggregate mean, and the marginal value of a single seat equals the average profit per seat.

$$exp\_dmnd_{k,ef,r} = agg\_fcst_{k,ef,r} \quad (53)$$

$$exp\_profit_{k,ef,r} = agg\_fcst_{k,ef,r} \times avg\_profit_{k,ef,r} \quad (54)$$

$$m\,arg\_value_{k,ef,r} = avg\_profit_{k,ef,r} \quad (55)$$

i) If undersell equals false, the next check is to determine if a sellout situation exists; the aggregate forecast for row k is significantly greater than the remaining capacity for the resource. This check may be performed by subtracting four times the standard deviation to the forecast mean and comparing it to the remaining capacity of the resource less 1 (to adjust for rounding error)

$$min\_dmd_{k,ef,r} = (agg\_fcst_{k,ef,r} - (4 \times agg\_st\_dev_{k,ef,r})) \quad (56)$$

$$sellout = \{true \text{ if } (rem\_cap_{ef,r}-1) \leq (min\_dmd_{k,ef,r})\} \quad (57)$$

j) If sellout equals true, the expected demand equals the remaining capacity, the expected profit equals the average profit per seat times the remaining capacity of the resource, and the marginal value of a single seat equals the average profit per seat.

$$exp\_dmnd_{k,ef,r} = rem\_cap_{ef,r} \quad (58)$$

$$exp\_profit_{k,ef,r} = rem\_cap_{ef,r} \times avg\_profit_{k,ef,r} \quad (59)$$

$$m\,arg\_value_{k,ef,r} = avg\_profit_{k,ef,r} \quad (60)$$

k) If undersell and sellout both equal false, the expected demand, profit, marginal value are calculated by determining the area under the curve generated by the probability mass function (pmf) of the normal distribution clipped to a minimum value of 0 and a maximum value of remaining capacity, with the mean equaling the aggregate forecast mean and the standard deviation equaling the aggregate standard deviation.

$$exp\_dmnd_{k,ef,r} = \sum_{x=max(0,min\_dmd_{k,ef,r})}^{rem\_cap_{ef,r}} (X \times pmf_N(x, agg\_fcst_{k,ef,r}, agg\_st\_dev_{k,ef,r})) \quad (61)$$

$$exp\_profit_{k,ef,r} = \sum_{x=max(0,min\_dmd_{k,ef,r})}^{rem\_cap_{ef,r}} (avg\_profit_{k,ef,r} \times (x \times pmf_N(x, agg\_fcst_{k,ef,r}, agg\_st\_dev_{k,ef,r}))) \quad (62)$$

$$marg\_value_{k,ef,r} = \frac{exp\_profit_{k,ef,r}}{exp\_dmnd_{k,ef,r}} \quad (63)$$

Fourth, the expected demand, expected profit, and marginal value for each row k of the matrix of possible combinations. Fifth, the maximum expected profit may be determined. The corresponding availability controls may be returned to the user as the optimal availability controls. Specifically, after each row k is evaluated, the newly calculated expected profit may be compared with the previous maximum. If the new value is greater, the previous maximum may be replaced with the new value and may be call called an optimal profit. The new k may be considered to provide the optimal combination of availability recommendations and the associated marginal value may be considered the optimal marginal value.

$$opt\_avl\_status_{ef,r,dc} = avl\_status_{ef,r,dc,k},$$
$$\text{where } k = \max_k(exp\_profit_{k,ef,r}) \tag{64}$$

$$opt\_profit_{ef,r} = \max_k(exp\_profit_{k,ef,r}) \tag{65}$$

$$opt\_marg\_value_{ef,r} = marg\_value_{ef,r,k(opt)} \tag{66}$$

Finally, the expected profit represented by the current availability status may be determined. The expected profit may be returned to the user to aid in assessing the value of changing the availability controls. Specifically, the expected profit associated with row m of the matrix may be determined, where row m reflects the current availability status, using the following three equations.

$$cur\_avl\_status_{ef,r,dc} = avl\_status_{ef,r,dc,m} \tag{67}$$

$$cur\_profit_{ef,r} = (exp\_profit_{m,ef,r}) \tag{68}$$

$$cur\_m\ arg\_value_{ef,r} = m\ arg\_value_{ef,r,m} \tag{69}$$

One of ordinary skill in the art will appreciate that the above optimization algorithm may be modified to take into account specific optimization needs and/or problems. Thus, the illustrative algorithm should not be construed to limit the present invention.

Although the present invention is preferably implemented in software, this is not a limitation of the present invention as those of ordinary skill in the art can appreciate that the present invention can be implemented in hardware or in various combinations of hardware and software, without departing from the scope of the invention. Modifications and substitutions by those of ordinary skill in the art are considered to be within the scope of the present invention, which is not to be limited except by the claims that follow.

The foregoing description of the preferred embodiments of the present invention has been presented for the purposes of illustration and description. It is not intended to be exhaustive or to limit the invention to the precise form disclosed. It will be apparent to those of ordinary skill in the art that various modifications and variations can be made in the event revenue management system of the present invention without departing from the spirit or scope of the invention. Thus, it is intended that the present invention covers the modifications and variations of this invention provided that they come within the scope of any claims and their equivalents.

APPENDIX I

| Field Name | Field Type | Field Length | Nullable? | Comments |
|---|---|---|---|---|
| VenueRaw | | | | |
| VenueName | Alpha-Numeric | 50 | | Key<br>Ex: New York Metropolitan Opera, San Jose Arena |
| VenueDisplayName | Alpha-Numeric | 15 | | Ex: The Met, The Tank |
| VenueRawDesc | Alpha-Numeric | 50 | | |
| VenueRawCapacity | Integer | 7 | | Default = 1<br>All values >= 1 |
| VenueAddressLine1 | Alpha-Numeric | 50 | | |
| VenueAddressLine2 | Alpha-Numeric | 50 | | |
| VenueCity | Alpha-Numeric | 50 | | |
| VenueState | Alpha-Numeric | 2 | | |
| VenueZipCode | Alpha-Numeric | 10 | | |
| VenuePhoneNum | Alpha-Numeric | 20 | | |
| VenueInfoPath | Alpha-Numeric | 50 | | |
| VenueConfigured | | | | |
| VenueConfigName | Alpha-Numeric | 50 | | Key<br>Ex: San Jose Arena-Hockey, San Jose Arena-Circus |
| VenueName | Alpha-Numeric | 50 | | Ex: New York Metropolitan Opera, San Jose Arena |
| VenueConfigDisplayName | Alpha-Numeric | 15 | | Ex: Tank (Circus) |
| VenueConfigDesc | Alpha-Numeric | 75 | | Ex: San Jose Shark Tank set up for special performance of Circque Du Soleil |
| VenueConfigCapacity | Integer | 7 | | Default = 1<br>All values >= 1 |
| SeatMapIcon | Alpha-Numeric | 50 | | |
| StreetMapPath | Alpha-Numeric | 50 | | |
| VenueResourceVirtual | | | | |
| ResourceName | Alpha-Numeric | 50 | | Key<br>Ex: Lower Box, Bleacher |

APPENDIX I-continued

| Field Name | Field Type | Field Length | Nullable? | Comments |
|---|---|---|---|---|
| VenueConfigName | Alpha-Numeric | 50 | | Key<br>Ex: San Jose Arena-Hockey, San Jose Arena-Circus |
| ResourceDisplayName | Alpha-Numeric | 15 | | Ex: Mezzanine, Bleacher |
| ResourceVirtualDesc | Alpha-Numeric | 75 | | Ex: Lower box seats on left side of field for baseball game |
| ResourceCapacity | Integer | 7 | | Default = 1<br>All values >= 1 |
| AvgConcessionsRevenue | Currency | 9.9 | | Default = 0.00<br>All values >= 0.00 |
| AvgConcessionsCostAmt | Currency | 9.9 | | Default = 0.00<br>All values >= 0.00 |
| UpgradeToResourceName | Alpha-Numeric | 50 | Y | Ex: Lower Box |
| ResourceSortOrderNum | Alpha-Numeric | 7 | | Ex: P03, P12 |
| ResourcePriceDiscountClass | | | | |
| ResourceName | Alpha-Numeric | 50 | | Key<br>Ex: Lower Box, Bleacher |
| VenueConfigName | Alpha-Numeric | 50 | | Key<br>Ex: San Jose Arena-Hockey, San Jose Arena-Circus |
| PriceDiscountClassName | Alpha-Numeric | 50 | | Ex: Senior citizen |
| EventTypeName | Alpha-Numeric | 15 | | Ex: Mezzanine, Bleacher |
| TimingCategoryIDName | Alpha-Numeric | 75 | | Ex: Lower box seats on left side of field for baseball game |
| TimingCategoryName | Integer | 7 | | Default = 1<br>All values >= 1 |
| PriceDiscountClassDisplayName | Alpha-Numeric | 15 | | Ex: Senior, Reg, GRLS |
| PriceDiscountClassDesc | Alpha-Numeric | 75 | | Ex: Discount given to seniors who are at least 65 years old or older |
| ValueBreakPct | Integer | 3 | | 0 <= % <= 100 |
| AvailabilityFlexibleStatus | Character | 1 | | Default = "Y"<br>Valid Values = "Y" & "N" |
| AvgConcessionsRevenueAmt | Currency | 9.9 | | Default = 0.00<br>All values >= 0.00 |
| AvgConcessionsCostAmt | Currency | 9.9 | | Default = 0.00<br>All values >= 0.00 |
| TicketsSoldNormalPct | Integer | 3 | | 0 <= % <= 100 |
| BuyupProbability | Integer | 4 | | 0 <= % <= 100 |
| EventResource | | | | |
| EventName | Alpha-Numeric | 50 | | Key<br>Ex: SF Giants vs. NY Rangers at PacBell Park |
| EventDateTime | Date/Time | 19 | | Key<br>Format: yyyy-mm-dd hh:mm AM/PM |
| ResourceName | Alpha-Numeric | 50 | | Key<br>Ex: Lower Box, Bleacher |
| VenueConfigName | Alpha-Numeric | 50 | | Ex: San Jose Arena-Hockey, San Jose Arena-Circus |
| ExpectedTicketProfitAmt | Currency | 9.9 | | Default = 0.00<br>All values >= 0.00 |
| ExpectedRevenueTotalAmt | Currency | 9.9 | | Default = 0.00<br>All values >= 0.00 |
| ExpectedRevenuePASAmt | Currency | 9.9 | | Default = 0.00<br>All values >= 0.00 |
| OptimalTicketProfitAmt | Currency | 9.9 | | Default = 0.00<br>All values >= 0.00 |
| OptimalRevenueTotalAmt | Currency | 9.9 | | Default = 0.00<br>All values >= 0.00 |
| OptimalRevenuePASAmt | Currency | 9.9 | | Default = 0.00<br>All values >= 0.00 |
| BuyupProbability | Integer | 4 | | 0 =< % =< 100 |

APPENDIX I-continued

| Field Name | Field Type | Field Length | Nullable? | Comments |
|---|---|---|---|---|
| UpgradeLimitNum | Integer | 4 | | Default = 0<br>All values >= 0 |
| LastSeatMarginalValue | | 9 | | Equal "0" on initial data load |
| OptSeatSoldNum | | 9 | | Equal "0" on initial data load |
| ValueClass | | | | |
| EventName | Alpha-Numeric | 50 | | Key<br>Ex: SF Giants Vs NY Rangers at PacBell Park |
| EventDateTime | Date/Time | 19 | | Key<br>Format: yyyy-mm-dd hh:mm AM/PM |
| ResourceName | Alpha-Numeric | 50 | | Key<br>Ex: Lower Box, Bleacher |
| PriceDiscountClassName | Alpha-Numeric | 50 | | Key<br>Ex: Senior citizen |
| VenueConfigName | Alpha-Numeric | 50 | | Ex: San Jose Arena-Hockey, San Jose Arena-Circus |
| EventTypeName | Alpha-Numeric | 15 | | Ex: Mezzanine, Bleacher |
| TimingCategoryIDName | Alpha-Numeric | 75 | | Ex: Lower box seats on left side of field for baseball game |
| AvgPriceAmt | Currency | 9.9 | | Default = 0.00<br>All values >= 0.00 |
| VariableProfitAmt | Currency | 9.9 | | Default = 0.00<br>All values >= 0.00 |
| CurrentAvailabilityStatus | Character | 1 | | Default = "Y"<br>Valid values = "Y" & "N" |
| OptimalAvailabilityStatus | Character | 1 | | Default = "Y"<br>Valid values = "Y" & "N" |
| EventBookingTemp | | | | |
| TransactionID | Alpha-Numeric | 50 | | Key |
| EventName | Alpha-Numeric | 50 | | Key<br>Ex: SF Giants Vs NY Rangers at PacBell Park |
| EventDateTime | Date/Time | 19 | | Format: yyyy-mm-dd hh:mm AM/PM |
| TransactionDateTime | Date/Time | 19 | | Format: yyyy-mm-dd hh:mm AM/PM |
| ResourcePurchasedName | Alpha-Numeric | 50 | | Key<br>Ex: Lower Box, Bleacher |
| ResourceRequestedName | Alpha-Numeric | 50 | Y | Key<br>Ex: Lower Box, Bleacher |
| DiscountClassPurchaseName | Alpha-Numeric | 50 | | Key<br>Ex: Senior citizen |
| DiscountClassRequestedName | Alpha-Numeric | 50 | Y | Key<br>Ex: Senior citizen |
| TicketPurchaseNum | Integer | 3 | | Values >= 1 |
| TicketsReturnedNum | Integer | 3 | | Values >= 0 |
| TotalRevenueAmt | Currency | 9.9 | | All values >= 0.00 |
| PointofSaleName | Alpha-Numeric | 50 | Y | |
| SeasonHolderFlag | Character | 1 | | Valid Values = "Y" & "N" |
| User | | | | |
| UserName | Alpha-Numeric | 50 | | Key |
| VenueName | Alpha-Numeric | 50 | | Key |
| UserDesc | Alpha-Numeric | 75 | | |

What is claimed is:

1. A method for managing revenue for an event, the event having event parameters including timing, resource, and discount categories, the method comprising:

a step for initializing forecasting parameters, wherein the forecasting parameter initialization step comprises creating a matrix comprising entries for each combinations of said timing, resource, and discount categories such that each row of the matrix is an allowable combination of each discount category, and wherein said timing categories comprising past and present future timing categories;

a step for aggregating historical data using the forecasting parameters to generate initial forecast statistics for said matrix entries, taking into account the event parameters, wherein the initial forecast statistics for each of said entries comprise a fractional build curve, final net forecast, and remaining demand forecast, wherein each of the fractional build curves for entries associated with future timing categories is generated by calculating a weighted average of one or more historical curves associated with relevant past timing categories, wherein the weighting for each of the historical curves and the fractional build curves are calculated by normalizing the historical curves found by $\alpha*(1-\alpha)^{(j-1)}\}$ where $\alpha$ is a predefined smoothing constant and j is a number of time periods between the timing period of the historical curve and the timing period of the fractional build curve, and wherein the final net forecast and remaining demand forecast for each of the entries is calculated using a booking curve comprising prior sales and forecasted net sales associated with each of the entries;

a step for forecasting demand by updating the initial forecast statistics based on current data; and a step for optimizing pricing of the event, wherein said pricing optimization step comprises, defining a forecast mean for each of the entries representing the net remaining demand associated with the entries, setting a forecast variance for each of the forecast means, aggregating the forecast means for the entries associated with available discount categories, aggregating the forecast variance for the entries associated with available discount categories, calculate an average profit for each row by aggregating a profit per each of the discount category times the forecast mean for the discount category and dividing by the aggregated resource mean, and calculating the expected demand, expected profit, and marginal value for each row of the matrix, determining a maximum expected profit for each row using the expected demand, expected profit, and marginal value associated with that row, and identifying the row of entries producing a maximum expected profit.

2. The method of claim 1, wherein the aggregating is capable of selecting a virtual event category that matches the event, and wherein the virtual event category is used to calculate the initial forecast statistics.

3. The method of claim 2, further comprising:

a step for calculating seasonal event demand adjustment values, wherein the aggregating step produces seasonally-adjusted general statistics for the virtual event category for various combinations of the resource and discount categories, and wherein the demand forecasted in the forecasting step includes demands for days-out bins, a gross event demand, a seasonalized event demand, and an endpoint demand.

4. The method of claim 1, wherein the forecasting step updates the fractional build curve, forecast, and remaining demand forecast.

5. The method of claim 1, wherein the optimizing step adjusts an availability of the discount categories.

6. The method of claim 1, further comprising:

a step for calculating seasonal event demand adjustment values, wherein the seasonal event demand adjustment values are used by the aggregating and forecasting steps.

7. The method of claim 1, wherein the forecasting step takes into account external factors.

8. The method of claim 7, wherein the external factors include opponent information, win/loss record, promotions, and weather.

9. The method of claim 1, further comprising:

a step for allowing a user to adjust calculations performed in the initializing, aggregating, forecasting, and optimizing steps.

10. A method for managing revenue for a plurality of events, comprising:

loading historical data and event information regarding each of the plurality of events, wherein the event information categories includes venue configuration, event, date and time, resource category, and discount category information;

initializing forecasting parameters for each of the plurality of events;

generating initial forecast statistics for each of the plurality of events by aggregating appropriate historical data using corresponding forecasting parameters, taking into account corresponding event information, wherein the initial forecast statistics comprise a fractional build curve, final net forecast, and remaining demand forecast for each of event information categories, wherein a fractional build curves associated with a future timing categories is generated by calculating a weighted average of a historical curves associated with a past timing categories, wherein the weighting for the historical curve and the fractional build curve are calculated by normalizing the historical curves found by $\alpha*(1-\alpha)^{(j-1)}\}$ where $\alpha$ is a predefined smoothing constant and j is a number of time periods between the timing period of the historical curve and the timing period of the fractional build curve, updating the initial forecast statistics for each of the plurality of events based on appropriate current data, wherein the updating step comprises forecasting demand for the each of the plurality of events; and optimizing pricing for each of the plurality of events wherein said pricing optimization step comprises a step for calculating the expected demand, expected profit, and marginal value each possible combinations of pricing categories for the events, determining a maximum expected profit for possible combinations of pricing categories using the expected demand, expected profit, and marginal value associated with that row, and identifying the combination of pricing categories producing a maximum expected profit.

11. The method of claim 10, wherein the generating step is capable of selecting a virtual event category for each event in the plurality of events, wherein the virtual event category matches a corresponding event and is used to calculate the initial forecast statistics for the corresponding event.

12. The method of claim 11, further comprising:

calculating seasonal event demand adjustment values for each of the plurality of events, wherein the generating step produces seasonally-adjusted general statistics for the virtual event category for various combinations of the resource and discount categories for each of the plurality of events, and wherein the demand forecasted in the forecasting step includes demands for days-out bins, a gross event demand, a seasonalized event demand, and an endpoint demand.

13. The method of claim 10, wherein the forecasting step updates the fractional build curve, forecast, and remaining demand forecast.

14. The method of claim 10, wherein the optimizing step adjusts an availability of the discount categories for each event in the plurality of events.

15. The method of claim 10, further comprising:
calculating seasonal event demand adjustment values for each of the plurality of events,
wherein the seasonal event demand adjustment values are used in the generating and forecasting steps.

16. The method of claim 10, wherein the forecasting step takes into account external factors.

17. The method of claim 16, wherein the external factors include opponent information, win/loss record, promotions, and weather.

18. The method of claim 10, further comprising:
allowing a user to adjust calculations performed in the loading initializing, generating, forecasting, and optimizing steps.

19. A program storage device readable by a machine, tangibly embodying a program of instructions executable by a machine to perform method steps of managing event revenue, the event having event parameters including timing, resource and discount categories, the method steps comprising:
initializing forecasting parameters, wherein the forecasting parameter initialization step comprises creating a matrix comprising entries for each combinations of said timing, resource, and discount categories such that each row of the matrix is an allowable combination of each discount category, and wherein said timing categories comprising past and present future timing categories;
aggregating historical data using the forecasting parameters to generate initial forecast statistics for said matrix entries, taking into account the event parameters, wherein the initial forecast statistics for each of said entries comprise a fractional build curve, final net forecast, and remaining demand forecast,
wherein each of the fractional build curves for entries associated with future timing categories is generated by calculating a weighted average of one or more historical curves associated with relevant past timing categories, wherein the weighting for each of the historical curves and the fractional build curves are calculated by normalizing the historical curves found by $\alpha*(1-\alpha)^{(j-1)}\}$ where $\alpha$ is a predefined smoothing constant and j is a number of time periods between the timing period of the historical curve and the timing period of the fractional build curve;
forecasting demand by updating the initial forecast statistics based on current data; and
optimizing pricing of the event, wherein said pricing optimization step comprises, defining a forecast mean for each of the entries representing the net remaining demand associated with the entries, setting a forecast variance for each of the forecast means, aggregating the forecast means for the entries associated with available discount categories, aggregating the forecast variance for the entries associated with available discount categories, calculate an average profit for each row by aggregating a profit per each of the discount category times the forecast mean for the discount category and dividing by the aggregated resource mean, and calculating the expected demand, expected profit, and marginal value for each row of the matrix, determining a maximum expected profit for each row using the expected demand, expected profit, and marginal value associated with that row, and identifying the row of entries producing a maximum expected profit.

* * * * *